United States Patent [19]
Terabayashi et al.

[11] 4,252,342
[45] Feb. 24, 1981

[54] SAFETY SEATBELT SYSTEM

[75] Inventors: Gosaku Terabayashi, Toyota; Tatsushi Kubota, Okazaki; Mitsuaki Katsuno, Toyota, all of Japan

[73] Assignees: Toyota Jidosha Kogyo Kabushiki Kaisha; Kabushiki Kaisha Tokai Rika Denki Seisakusho, both of Aichi, Japan

[21] Appl. No.: 18,796

[22] Filed: Mar. 8, 1979

[30] Foreign Application Priority Data

Mar. 9, 1978 [JP] Japan .............................. 53-30352[U]

[51] Int. Cl.$^3$ ............................................. B60R 21/10
[52] U.S. Cl. .................................................. 280/803
[58] Field of Search ...................... 280/802, 803, 804; 180/268, 269, 270; 340/52 E

[56] References Cited
U.S. PATENT DOCUMENTS 3,368,197  2/1968  Lemon ................................ 340/52 E

FOREIGN PATENT DOCUMENTS 1407612  9/1975  United Kingdom ..................... 280/804
1428952  3/1976  United Kingdom ..................... 180/268

*Primary Examiner*—John A. Pekar
*Attorney, Agent, or Firm*—Koda and Androlia

[57] ABSTRACT

A safety seatbelt system which automatically provides a safety seatbelt around a passenger when he takes a seat in a vehicle and closes a door. Once the seatbelt is put around the passenger, he cannot remove the seatbelt while driving the vehicle. This system comprises a hand brake switch and a hand brake switch relay, and a solenoid magnetizing circuit for supplying magnetizing current to a solenoid to prevent the seatbelt from being hooked and removed from the passenger as long as the hand brake is released, said solenoid magnetizing circuit forming a second solenoid operating system.

5 Claims, 7 Drawing Figures

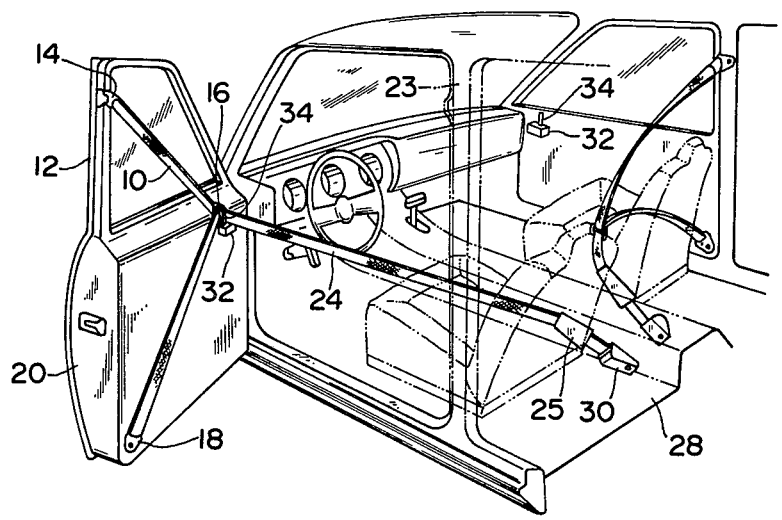
FIG_1
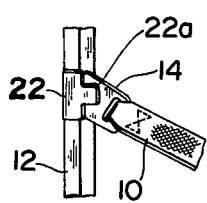
FIG_2
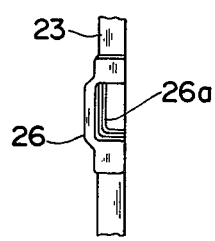
FIG_3
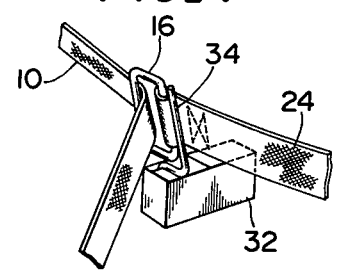
FIG_4

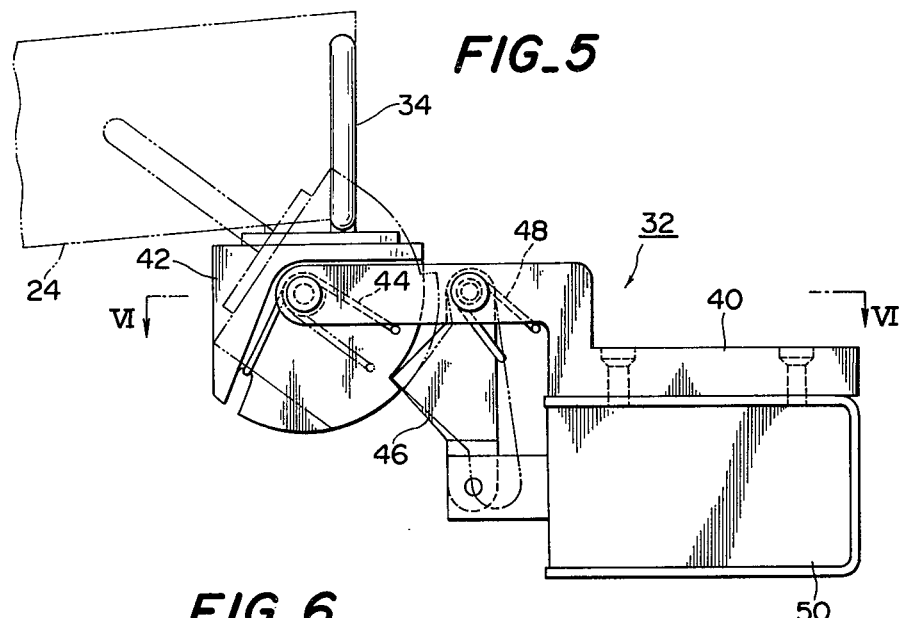
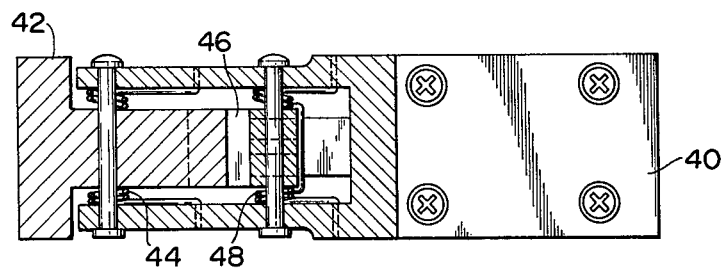
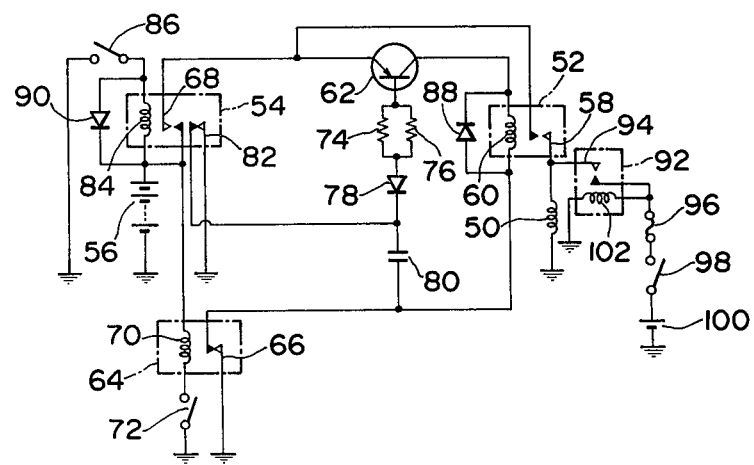

SAFETY SEATBELT SYSTEM

BACKGROUND OF THE INVENTION

1. Field of the Invention

This invention relates to a safety seatbelt system, and more particularly to a seatbelt system by which a passenger is automatically caused to be protected upon taking a seat in a vehicle.

2. Prior Art

Various types of safety seatbelt for motor vehicle, airplane, etc., have been proposed and some of them have been actually used in the vehicle and so forth. However, since it is troublesome to put on a seatbelt, passengers are not willing to bother wearing the seatbelt even though a seatbelt system is provided in the vehicle. As a result, there have occurred a significant number of serious accidents which could have been avoided if the passengers wore seatbelts.

Japanese Patent Applications Laid-Open No. 16,329/73 and No. 49,128/73 disclose prior improved safety seatbelt systems, in which the system comprises: a seatbelt provided across a seat; a hook means fixed on the front edge of a door or in front of the seat, which hooks the middle portion of the seatbelt; a solenoid which releases the seatbelt from the hook means; and a circuit which operates the solenoid when the passenger takes his seat and closes the door, whereby the passenger is automatically protected by the seatbelt while driving the vehicle. As a result, the running safety of the vehicle is remarkably improved. In these seatbelt systems, however, since the solenoid operating circuit is controlled by a ignition switch, a seat switch, a shift lever switch, a door switch, etc., the systems have suffered from some drawbacks, such as that the seatbelt may come off from the passenger if he takes the seatbelt and has it hooked with the hooking means while driving the vehicle, and that it may cause confusion to the passenger in operating each one of the switches, particularly a shift-lever switch.

SUMMARY OF THE INVENTION

Accordingly, it is the principal object of the present invention to provide a safety seatbelt system which prevents the seatbelt from being removed from the passenger while driving a vehicle.

It is another object of the present invention to provide a safety seatbelt system accomplishing the above object without having a complex structure.

In keeping with the principles of the present invention, the objects are accomplished by an improved safety seatbelt system comprising a hand-brake switch incorporated in a solenoid operating circuit thereby providing another solenoid operating system in addition to the system including the seat switch and door switch.

BRIEF DESCRIPTION OF THE DRAWINGS

The above-mentioned features and objects will become more apparent in the following description taken in conjunction with the accompanying drawings, wherein like elements are given like reference numerals and in which:

FIG. 1 is a perspective view of a motor vehicle provided with a safety seatbelt system of the present invention;

FIG. 2 is a perspective view of a connecting portion between a shoulder belt and a door flame;

FIG. 3 is a perspective view of a belt reinforce portion provided on a body of the vehicle;

FIG. 4 is a perspective view of a hooking means where a seatbelt is hooked by a hooking means of the present invention;

FIG. 5 is an enlarged side view of the hooking means of the present invention;

FIG. 6 is a cross sectional view along the line VI—VI in FIG. 5; and

FIG. 7 is a circuit diagram showing a preferred embodiment of a solenoid operating circuit for the safety seatbelt system of the present invention.

DETAILED DESCRIPTION OF THE INVENTION

Referring more particularly to the drawings, shown in FIGS. 1 through 7 is an embodiment of a safety seatbelt system of the present invention; more specifically three-point type safety seatbelt system applied to separate type front seats of a motor vehicle in accordance with the teachings of the present invention.

Referring to FIG. 1, one end of a shoulder belt 10 is attached to a shoulder anchor 14 firmly fixed to a door frame 12, and the other end thereof is, through a joint 16, coupled to a lap anchor 18 fixed to the lower end of a door 20. More specifically, the shoulder anchor 14 is fixed to the door frame 12 together with a reinforcement anchor 22 as in FIG. 2. A projection 22a of the reinforcement anchor 22 is so shaped as to fit in an opening 26a of an anchor receiver 26 firmly connected to a vehicle body 23 by welding as shown in FIG. 3, whereby the projection 22A of the reinforcement anchor 22 is engaged with the opening 26a of the anchor receiver 26 when the door 20 is closed. Thus, it can bear a heavy load applied to the shoulder belt 10 in case of collision and so forth. As shown in FIG. 1 and 4, fixed firmly to the joint 16 is one end of a lap belt 24, whose other end is connected with a retractor 30 coupled to a chassis 28 via a left guide 25. An emergency lock type retractor is employed for the retractor 30, which holds the belt 24 in case of sudden load or emergency. In FIG. 1, the safety belt for a driver's seat is hooked by a hooking means of the present invention, namely in the off and in positions. On the other hand, the safety belt for the other front seat is released from the hooking means, namely, in the on-position. The hooking means, in this embodiment, is fixed to the front edge of the door 20 whereby it is easy for passengers to get on and off the vehicle by hooking the lap belt 24 by a hook 34 of the hooking means 32.

In FIGS. 5 and 6, shown therein are details of the hooking means 32. The hook 34 is hinged on the edge of a body 40 and coupled to the door 20 to hook the belt 24. Provided between the body 40 and a hook support 42 is a return spring 44 which tends to keep the hook 34 in a hooking position shown by solid lines in FIG. 5. Hinged on the body 40 is a latch lever 46 having a nail which is supposed to engage with a slot of the hook support 42. A latch lever return spring 48 is provided between the body 40 and the latch lever 46 so as to push the latch lever 46 toward the hook support 42. The free end of the latch level 46 is coupled to a solenoid 50 fixed to the body 40.

Now referring to FIG. 7, there is shown a solenoid operating circuit to magnetize a solenoid 50. One end of the solenoid 50 is connected to the earth and the other end thereof is connected to a positive electrode of a battery 56 of the vehicle through a timer relay 52 and a seat switch relay 54. The timer relay 52 includes a relay contact point 58 and a magnetizing coil 60. One end of the magnetizing coil 60 is connected to a collector of a transistor 62 and the other end is connected to the earth through a contact point 66 of a door switch relay 64. One end of relay contact point 58 of the timer relay 52 is connected to the solenoid 50, and the other end thereof is connected to an end of a first contact point 68 of the seat switch relay together with the emitter of the transistor 62. The other end of the contact point 68 is connected to a door switch 72 through a magnetizing coil 70 of a door switch relay 64. The base of the transistor 62 is connected to the relay contact point 66 of the door switch relay 64 through a timer constant circuit comprising resistors 74 and 76, diode 78 and a condensor 80. The mid contact point between the diode 78 and the condensor 80 is connected to the earth through a second relay contact point 82 of the seat switch relay 54. An end of a magnetizing coil 84 of the seat switch relay 54 is connected to the positive electrode of the battery 56 and the other end thereof is connected to the earth through a seat switch 86. There are provided diodes 88 and 90 in parallel in each one of the relay 52 and 53 of the magnetizing coil to avoid opposite voltage.

In this invention, one of the characteristic features is to have a second solenoid magnetizing circuit including a hand brake switch relay 92 in addition to the solenoid magnetizing circuit by the solenoid 50 including the timer relay 52. One end of a relay contact point 94 of a hand brake switch relay 92 is connected to the solenoid 50 and the other end thereof is connected to the positive electrode of a battery 100 through a fuse 96 and a hand brake switch 98. The mid contact point between the fuse 96 and the contact point 94 is connected to the earth through a magnetizing coil 102.

The structure of the safety seatbelt system of the present invention is explained above; now the operation of the safety seatbelt system of the present invention is explained hereinbelow.

When the passenger stops the vehicle and gets off, the door switch 72 turns "off" with the door closed and the relay contact point 66 is "on". The seat switch 86 has been "on" upon passenger's taking a seat and the first contact point 68 turns on and the second contact point 82 turns "off" by magnetization of the magnetizing coil 84. As a result, the battery 56 is connected to the transistor 62 through the contact point 68; however, the transistor 62 is kept "off" by the timer function. Thus, the contact point 58 of the timer relay 52 turns "off". Since the passenger pulls the hand brake before getting off, the hand brake switch 98 turns "off" and no magnetizing current will be supplied to the relay 92 of the coil 102 from the battery 100. Therefore, the contact point 94 is kept "off". In this situation, no magnetizing current will be supplied to the solenoid from either solenoid magnetizing system, and in the hooking means 32 the nail of the hook receiver 42 engages with the latch lever 46 as shown by the solid line of FIG. 5. Thus, the hook 34 is not allowed to rotate. Accordingly, the passenger can put the belt 24 hooked at the hook 34 of the hooking means 32 coupled to the front edge of the door 20. When the door 20 is opened, the door switch 72 turns "on", and the contact point 66 of the relay turns "off". Thus, the transistor 62 is still kept "off" and the solenoid 50 is not magnetized, which allows the passenger to get off while the belt 24 is held by the hook 34.

When the passenger leaves the seat, the seat switch turns "off", and the first contact point 68 of the relay 54 turns "off" the second contact point 82 turns "on". When the second contact point 82 is turned "on," the electric charge at the condensor 80 of the transistor 62 is discharged through the second contact point 82, and the timer constant circuit gets back to its original state (unchanged). When the passenger leaves the vehicle and closes the door 20, the door switch 72 turns "off" and the relay contact point 66 becomes "on". However, since the first contact point 68 is "off" by the seat switch 86 being "off," the transistor 62 is kept "off" and no magnetizing current is supplied to the solenoid 50. Therefore, the hook 34 will keep the belt 24. FIG. 7 shows a state where the passenger left the seat and closed the door 20 and the hand brake is working.

Now, when the passenger gets in the vehicle, opening of the door 20 will turn the door switch 72 "on", and the contact point 66 turns the "off". Therefore, even though the first contact point 68 of the seat switch relay 54 turns "on" upon passenger taking a seat, the solenoid 50 will not be magnetized. When the door 20 is closed and the door switch 72 is turned "off", the contact point 66 will turn "on", and the voltage of the battery 56 is supplied to the emitter of the transistor 62 through the contact point 68. At the same time, the base of the transistor 62 is connected to the earth through the time constant circuit and the contact point 66, which allows the solenoid operating circuit closed. As a result, the latch lever 46 is disengaged from the hook receiver 42 because of the magnetization by the solenoid 50 as shown in FIG. 5; the hook 34 will rotate at an angle shown by the broken line in FIG. 5 by the pulling force of the retractor 30 and the belt 24 gets unhooked from the hook 34. Thus, the belt 24 will automatically fit around the passenger. When the belt 24 is unhooked from the hook 34, the hook 34 returns to its original position as shown by the solid line in FIG. 5 by the spring load of the latch lever return spring 44.

The solenoid 50 displays the magnetizing function only when the relay 52 is "on"; and the relay 52 is "on" only during the period of time as set by the time constant circuit comprising the resistors 74 and 76, and the condensor 80. In other words, the current at the base of the transistor 62 is supplied to the condensor 80 through the resistors 74 and 76 and the diode 78. As the charge in the condensor 80 of the transistor 62, the voltage at the base goes up in a certain period of time high enough to get the transistor 62 to turn "off". When the transistor 62 turns "off", the contact point 58 of the timer relay 52 turns "off" and also the magnetization of the solenoid turns "off". The timer for the above function may be set, for example, for 0.3 second; in other words, such time has to be enough to allow the belt 24 to be unhooked from the hook 34. After such time as set elapses, the solenoid 50 loses the magnetizing function; then, the latch lever 46 returns to its original position because of the spring load of the latch lever return spring 48. Thus, the hook 34 returns to its original position and the nail of the latch lever 46 engages with the recess of the hook receiver 42 to keep the hook 34 in this position.

When the passenger drives the vehicle, the hand brake is supposed to be released. Therefore, the hand brake switch 98 turns "on". Thus, the magnetizing current is supplied to the coil 102 of the relay 92 through the hand brake switch 98 and the fuse 96 from the battery 100 while driving the vehicle. This will allow the contact point 94 to turn "on" and the solenoid 50 receives the magnetizing current. Therefore, the latch lever 46 is kept disengaged from the hook receiver 42, and the belt 24 cannot be held with the hook 34. As a result, the passenger cannot remove the belt 24 by the hooking it with the hook 34, which will guarantee the full protection of the passenger by the seat-belt system.

According to the present invention, a regular hand brake switch to turn on a parking lamp may be used as the hand brake switch 98. Unlike a shift lever switch and the like, it is unnecessary to incorporate any additional switch system, since the existing circuit system can be utilized only by adding the hand brake relay 92 to obtain a solenoid operating circuit.

I claim:

1. A safety seatbelt system comprising a seatbelt, a pivotal hook to hold said seatbelt, said hook being disposed in the front edge of a door, a solenoid for causing said hook to pivot and to unhook said seatbelt from said hook, a solenoid operating circuit including a timing means for magnetizing said solenoid for a period of time to have said hook release said seatbelt when a passenger takes a seat and closes the door, further comprising:

a hand brake;

a hand brake switch actuated by operation of said hand brake; and a second solenoid operating circuit responsive to said hand brake switch for supplying magnetizing current to said solenoid to prevent said seatbelt from being removed from said passenger and hooked onto to said hook while said hand brake is released.

2. A safety seatbelt system according to claim 1, wherein said second solenoid operating circuit comprises a hand brake switch relay coupled to said solenoid, said relay comprising relay contact points coupled to said solenoid and a magnetizing coil coupled to said hand brake switch.

3. A safety seatbelt system according to claim 2, wherein one point of said relay contact points is connected to said solenoid and the other point thereof is connected to a battery through said hand brake switch.

4. A safety seatbelt system according to claim 3, wherein said magnetic coil is connected to said relay contact points such that said magnetic coil is supplied with magnetizing current from said battery upon releasing said hand brake, whereby said relay contact points are energized and supply magnetizing current to said solenoid to keep said seatbelt unhooked with said hook.

5. A safety seatbelt system according to claim 1, wherein said hand brake switch is coupled to a parking light for controlling said parking light.

* * * * *